United States Patent [19]
Sakamoto et al.

[11] Patent Number: 5,157,439
[45] Date of Patent: Oct. 20, 1992

[54] FILM PROCESSING APPARATUS

[75] Inventors: Norio Sakamoto, Sagamihara; Takashi Itoh, Tamadaira-Hino; Kenji Yamanouchi, Hino; Makoto Ikeda, Hino, all of Japan

[73] Assignee: Konica Corporation, Tokyo, Japan

[21] Appl. No.: 729,558

[22] Filed: Jul. 15, 1991

[30] Foreign Application Priority Data

Jul. 24, 1990 [JP] Japan .................................. 2-195887

[51] Int. Cl.⁵ .......................................... G03B 29/00
[52] U.S. Cl. ...................................... 355/28; 355/35; 355/40
[58] Field of Search ...................... 355/28, 29, 35, 40

[56] References Cited

U.S. PATENT DOCUMENTS 4,293,215 10/1981 Rosborough et al. ................ 355/28
4,922,289 5/1990 Kogane et al. ........................ 355/29

Primary Examiner—Monroe H. Hayes
Attorney, Agent, or Firm—Finnegan, Henderson, Farabow, Garrett and Dunner

[57] ABSTRACT

An automatically controlled film packaging system which is capable of exposing necessary data as a latent image onto the edges of pre-used film according to the input signal of a unit length required for the merchandise cutting the film into the unit length and taking the film up on a selected patrone, comprising a center processing unit which controls the system automatically when the unit length required is shifted, without any manual re-setting but only by inputting a new unit length of the film required for the merchandise to be produced.

6 Claims, 3 Drawing Sheets

FIG. IA
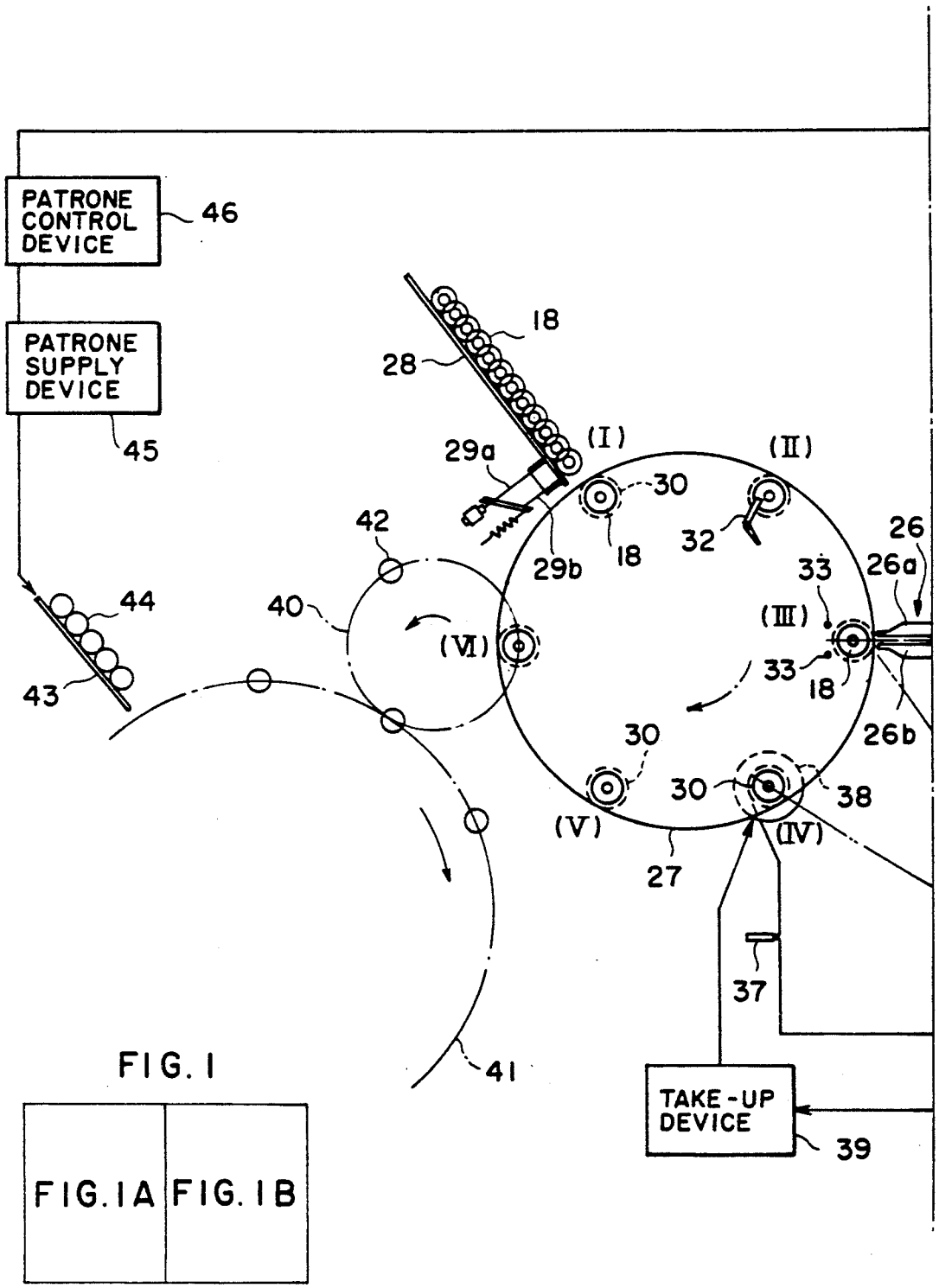
FIG. I
| FIG.IA | FIG.IB |
|--------|--------|

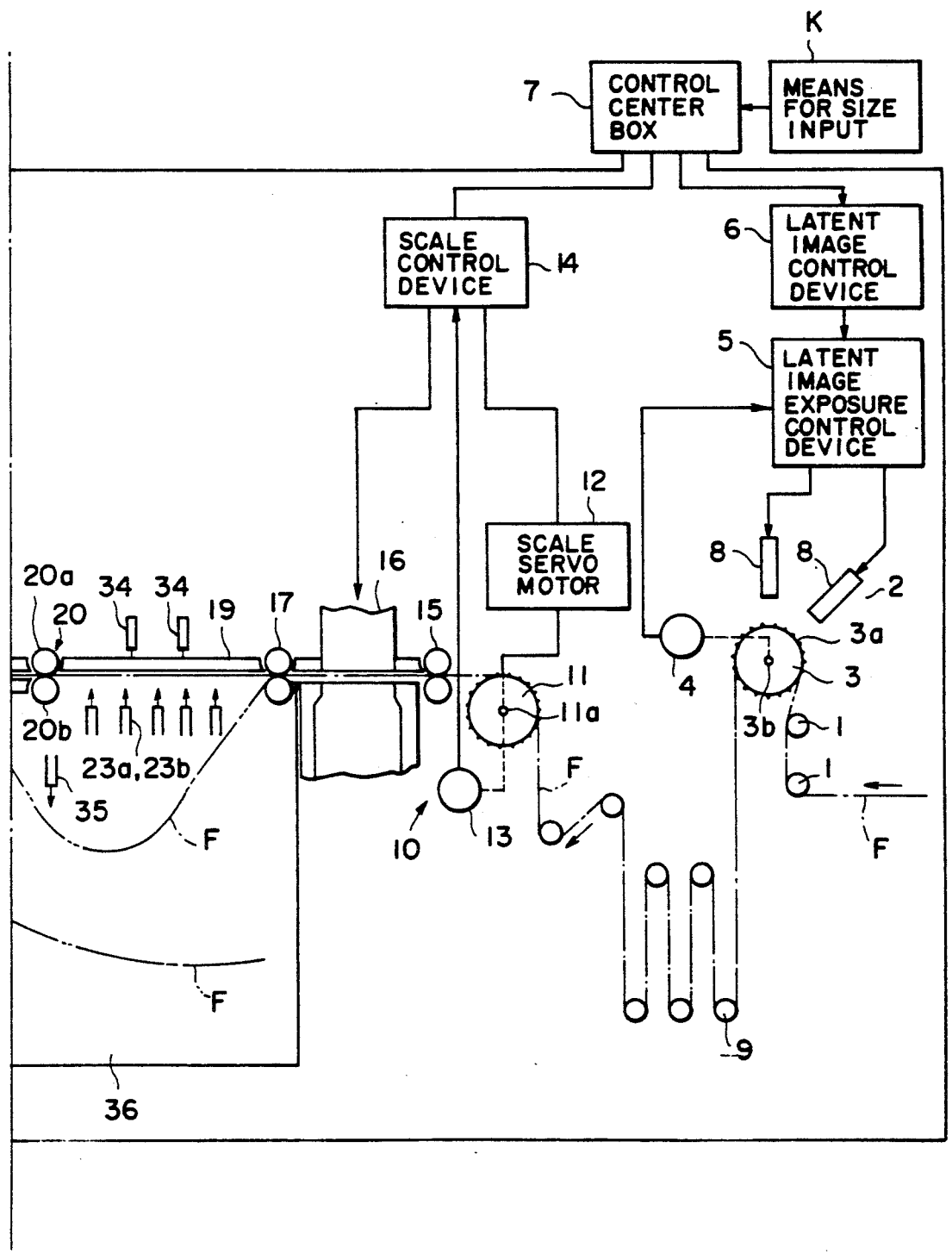
FIG. IB

FILM PROCESSING APPARATUS

FIELD OF THE INVENTION

The present invention is concerned with a film processing apparatus, wherein a latent image is printed onto an unexposed film, the film is cut into a definite length and wound onto a spool, and thereafter loaded into a package material.

BACKGROUND OF THE INVENTION

Up to this time, film processing apparatuses have used a latent image exposer, where a latent image of a previously determined film size is exposed onto a long and unexposed film which has been drawn out of the initial magazine. Mounting means hold the film on which this latent image has been exposed, on a spool. The scale portion of the film on which this latent image has been exposed, is cut into a prescribed length, and the take-up means takes up the film which has been cut into a prescribed length.

However, in conventional film processing apparatuses, if there arises a change in the film size during production and processing in the course of manufacturing, for example, if there is a change from a film size of 36 exposures to a film size of 12 exposures, it is necessary to change the data for the latent image which is to be exposed onto the film in accordance with such change. The number of revolutions of the scale sprocket depending on the cutting length, the number of take-up revolutions of film held on the spool, and further the type of patrone and cap, which serve as a package material for the film, must be changed. The work involved in such changes is not easy, since the work can not been carried out automatically.

Additionally, in conventional film processing apparatuses, there are some which have a number of film conveying paths provided, and films are cut to a prescribed length, taken up and loaded according to each size of the respective conveying path. However, the above film processing apparatus have shortcomings due to the complexity and large size of the apparatus.

SUMMARY OF THE INVENTION

The present invention aims at dissolving the above shortcomings of conventional film processing apparatuses, and aims at providing a film processing apparatus, which electrically can expose prescribed latent images conforming to the film size onto the film, cut the film into prescribed film lengths, and further control the film to make, take-up rotations according to the prescribed film length, even if there arises a change in the film size for production and processing in the course of manufacturing. Furthermore, the above apparatus electrically can control the switching of the prescribed package material, thereby permitting changes in film size easily and allowing such switching in a short time. In other words, it is a film processing apparatus of the following description.

1. In film processing apparatuses having the latent image exposer which exposes latent image onto an unexposed film being conveyed, includes mounting means which hold the film, onto which this latent image has been exposed, on a spool, a scale portion where the film on which this latent image has been exposed, is cut into a prescribed length, and take-up means which takes up the above film which has been cut into a prescribed length, further characterized by having means for size input, which sets the size of film, the control means, which output a control signal based on the size setting from the means for size input, latent image control means, which controls the latent image exposer by the control signal so as to expose the prescribed latent image onto the film, scale portion control means, which control the scale portion by the control signal so as to cut the film into the prescribed film length, and take-up control means, which control the take-up means in response to the control signal, so as to make take-up rotations according to the prescribed film length.

2. A film processing apparatus characterized by having the scale portion, which cuts the film on to which the latent image has been exposed, into a prescribed length, after the film is held on the spool.

3. A film processing apparatus characterized by having mounting means which holds the film on which the latent image has been exposed, on the spool, after the film is cut into a prescribed length.

4. A film processing apparatus characterized by providing the package material charging means, which collects the film taken up on the spool by conveying it into the package material, and also by having the package material supply control means, which control the package material charging means by the above control signal, so as to have the package material charging means switched to the prescribed package material.

BRIEF DESCRIPTION OF THE DRAWING

FIGS. 1, 1a.and 1b are general outline drawings illustrating the construction of the film processing apparatus under the present invention.

Figure 2:
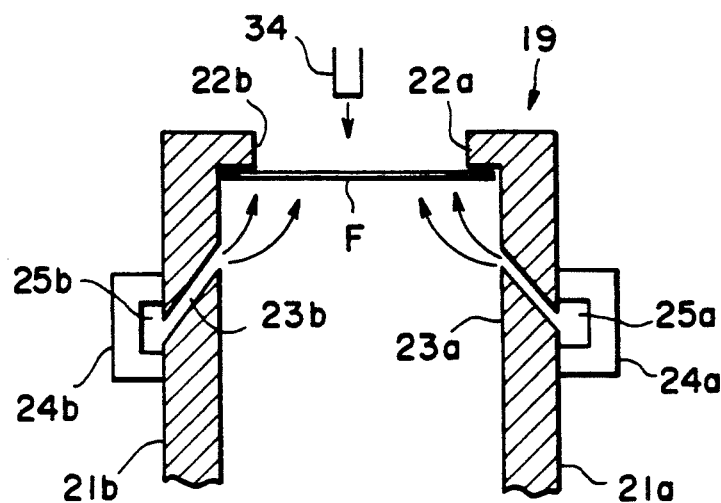
FIG. 2 is a cross sectional view of the guide rail.

In the drawings, symbol F is the film, 2 the latent image exposer, 3 the exposure sprocket, 5 the latent image exposure control device, 6 the latent image control device, 7 the control means, 10 the scale portion, 11 the scale sprocket, 14 the scale control device, 16 the scale cutter mechanism, 18 the spool, 19 the guide rail, 20 the insertion roller, 26 the insertion guide, 27 the spool turret, 30 the spool chuck, 38 the take-up servomotor, 39 the take-up control device, 40 the transfer turret, 41 the patrone turret, 42 the receiving holder, 44 the patrone, 45 the patrone supply device, 46 the patrone control device, and K the means for inputting size setting.

DETAILED DESCRIPTION OF THE INVENTION

In order to solve the above problems, the invention stated above is characterized by a film processing apparatus having a the latent image exposer which exposes latent image onto an unexposed film being conveyed, mounting means which holds the film on which this latent image has been exposed, on a spool, the scale portion where the film, to which this latent image has been exposed, is cut into a prescribed length, and take-up means which takes up the film which has been cut into a prescribed length, means for size input which set up the size of the above film control means which output a control signal based on the size setting from the means for size input, latent image control means which control the above latent image exposer by the control signal so as to expose the prescribed latent image onto the film, scale portion control means which control the scale portion by the control signal so as to cut the film into the prescribed film length, and take-up control means which control the take-up means by the control signal, so as to produce take-up rotations according to the prescribed film length.

Further, the film processing apparatus according to the invention is characterized by having the scale portion, which cuts the film onto which the latent image has been exposed, into a prescribed length, after the film is held on the spool.

Further, the film processing apparatus according to the invention is characterized by having the mounting means, which holds the film onto which the latent image has been exposed, on the spool, after the film is cut into a prescribed length.

Furthermore, the film processing apparatus according to the invention is characterized by providing the package material charging means, which collects the film taken up on the spool by charging into the package material, and also by having the package material supply control means, which controls the above package material charging means by the above control signal, so as to have the above package material charging means switched to the prescribed package material.

OPERATION

According to the inventions, in case the size of an unexposed film being conveyed is to be changed, it is possible to take up the film of the prescribed size, by changing the film to the prescribed size by the means for size input. The latent image control means, scale control means and take-up means are controlled according to a control signal from the control means, when the latent image conforming to the film size, which has been changed, is exposed, and after the film is cut into the prescribed length and held on the film spool. Further, according to the invention in addition to the change in film size, the package material is switched to the prescribed package material which has been changed, and then loading the film into the package material is carried out.

EXAMPLES

Next, embodiments of the present invention are explained in detail according to the attached drawings., FIGS. 1a and b are general outline drawings illustrating the construction of the film processing apparatus under the present invention.

In FIG. 1B, an unexposed, long film F drawn out of the originally wound magazine, not shown in the diagram, is wound onto the exposure sprocket 3, which communicates with the latent image exposer, while being regulated by the guide roller 1. Respective tooth a of this exposure sprocket 3 engages correspondingly with each perforation in the film F, and conveyance of the film and rotation of this exposure sprocket 3 are synchronized. To the rotary axis 3 b of exposure sprocket 3, the rotary encoder 4 is directly connected, and transmits signals synchronism with the rotation of rotary axis 3b of exposure sprocket 3, to the latent image exposure control device 5. The latent image exposure control device 5 is connected to the latent image control device 6, which prepares, edits and sets the latent image data corresponding to the size of the film F and which also controls the latent image exposure command. Further, this latent image control device 6 is connected to the control means 7, which outputs control signals for switching the film size, and to which control means 7 the means for size input K is connected.

The means for size input K is formed of change-over switches. When the operator designates the film size, the control center box 7 controls the latent image control device 6 according to the size setting, and inputs the exposure command of the latent image, which conforms to the prescribed film size, into the latent image exposure control device 5. In this latent image exposure, control device 5, the designated position of the film F, onto which each latent image is to be exposed, is judged, according to the exposure command of the latent image and the signal, which is synchronous to rotation of the rotary axis 3b of the exposure sprocket 3, which is output from the rotary encoder 4. In response to the above, the latent image exposure, command is transmitted to the projector 8, which is located above the exposure sprocket 3. Due to the light from projector 8 the prescribed latent image is exposed on the prescribed position of the film F.

The film F, on which the latent image has been exposed, travels onto the scale sprocket 11, forming the scale portion, via the dancer roller 9. Rotary axis 11a of scale sprocket 11 is directly connected to the scale servomotor 12 and the scale rotary encoder 13, and rotates and stops by the action of the scale servomotor 12. The scale servomotor 12 and scale rotary encoder 13 are connected to the scale control device 14, and, further, scale control device 14 is connected to the control means 7. The scale control device 14 is controlled by the control signal from control means 7, and signals the number of rotations of the scale sprocket 11, which conforms to the cutting length of the film designated by the scale control device 14. These signals are sent to the scale servomotor 12. The above scale sprocket 11 makes a prescribed number of rotations according to this signal, thereby supplying the film F to the feeding roller 15.

Feeding roller 15 feeds the film F, being sent from the scale sprocket 11, between upper and lower blades of the scale cutter mechanism 16. The film is carried out by the drawing roller 17, which is installed, following this scale cutter mechanism 16. The scale cutter mechanism 16 is also connected to the scale control device 14, and cuts the film into a designated film size, according to the signal of the scale rotary encoder 14, and at the same time drills the holding holes for holding the film F, after being cut as above, on the spool 18.

Further, since the film F between scale cutter mechanism 16 and the latent image exposer 2, at the time of film size switching, has been exposed to the latent image before the switching, the whole film processing apparatus is controlled, so that the film is cut into the film size before the switching and subsequent processing is carried out as far as this portion is concerned.

The drawing roller 17, into which the film F has been inserted, leads film F to the insertion roller 20 in front, through guide rail 19. Construction of this guide rail is explained according to FIG. 2.

FIG. 2 is a cross-sectional view of the guide rail 19. In FIG. 2, the guide rail 19 consists of a pair of board members 21a, 21b constructed between the drawing roller 17 and the insertion roller 20, with a distance slightly larger than width of the film f. Sliding surfaces 22a, 22b, which are placed in "L" letter shape are located on the inner surfaces of upper fringe of each of the board members 21a, 21b. In order to slide both edges of the film F in width direction on these sliding surfaces 22a, 22b, a number of nozzles 23a, 23n, which blow out compressed air, are installed along the conveying direction, diagonally piercing through the wall surfaces of the board members 21a, 21b. These nozzles 23a, 23b are connected to the compressed air source, which is not shown in the diagram, via air passages 25a, 25b in the ducts 24a, 24b, which are provided the respective outer walls of the board members 21a, 21b. Therefore, the film F is conveyed in a condition of having both edges in the width direction being pressed against the sliding surfaces 22a, 22b by compressed air being blown out of the nozzles 23a, 23b.

The film F, which has been carried into the insertion roller 20, is guided by guide rail 19, and is inserted into the insertion guide 26, which consists of a pair of guides, installed consecutively thereto. The insertion roller 20 consists of the upper insertion roller 20a and lower insertion roller 20b. The lower insertion roller 20b can press against the upper insertion roller 20a under pressure or recede from it, depending upon the conditions of conveying the film F. Further, the lower insertion guide 26b can similarly keep an appropriate space with respect to the upper insertion guide 26a or recede from it, depending upon the conditions of conveying the film F.

As shown in FIG. 1a, film F, which is conveyed while being held in insertion guide 26, is then conveyed into the spool turret 27, which supplies the spool 18.

In spool turret 27, at the No. 1 station (I) the spool 18 which has been placed in the prescribed direction is continuously supplied from the rail chute 28. At the supplying tip of this rail chute, there are placed two shutter devices 29a, 29b, and by having these shutter devices 29a, 29b go in and out alternately, the spool 18 is supplied to the spool turret one by one. At the No. 1 station (I), the supplied spool 18 is chucked by the spool chuck, which is provided on spool turret 27 and acts with the spool turret 27 interlockingly. Chucked spool 18 is conveyed to the No. 2 station (II) by rotational movement of the spool turret 27.

Figure 3:
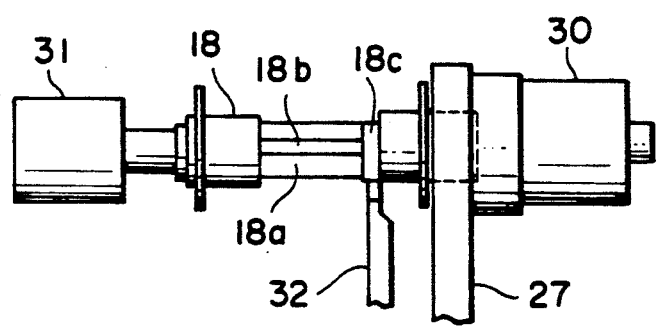
FIG. 3 is a side view at the No. 2 station of spool turret.

At the No. 2 station (II), as shown in FIG. 3, servomotor 31 is engaged with spool 18, thereby rotating spool 18 to the prescribed direction, so as to insert the tip of the film F, being conveyed from the insertion guide 26, into the slit 18b, which is open along the winding axis 18a of spool 18. In order to control this rotation, a depression 18c is made in the winding axis 18a of the spool 18, which engages with the orientation claw 32 installed in the No. 2 station (II), thereby stopping the rotation and determining the direction of slit 18b.

The spool 18, in the direction of the slit 18b has been described above, is rotated to the No. 3 station (III) consecutively. At the No. 3 station (III), the tip of the film F which has been led from the above insertion guide 26 is inserted into slit 18b of the spool 18, and at the same time the holding hole pierced at the film tip is held to the hook provided on slit 18b. When the film tip is detected by the sensor 33, the lower insertion roller 20b and the lower insertion guide 26b, described above, start to recede.

The scale sprocket 11, the feeding roller 15 and the drawing roller 17 rotate continuously until the film F equals the prescribed length and stops when the film F equals the prescribed length. Thereafter, the scale cutter mechanism 16 works to cut the film F. On account of the above operation, the film F bends between the drawing roller 17 and the spool 18, where the film tip is inserted and held. However, it is bent downward forcibly by blowing compressed air in a downward direction against the film F from the nozzle 34, which is placed above the guide rail 19. When film F is positioned below the nozzles 23a, 23b provided on the walls of the board members 21a, 21b by the above action, the lifting force on the film F no longer works, and the film F bends downward with a large arc by its own weight. Furthermore, mutual contact of the film F is prevented by placing the nozzle 35, which blows compressed air downward against bent film F, even in the space below this guide rail 19.

The film F, which is bent downward as described above, becomes free in a condition where its tip is inserted and held in slit 18b of the spool 18. The film F is cut by the scale cutter mechanism 16 and, thereafter, the rear end of the film is direction toward the guide rail 19, being driven by the drawing roller 17. In this condition, the spool turret 27 is rotated, thereby moving the spool 18 to the No. 4 station (IV). At this time, the nozzle 37 is provided in front of and below a conveying loop room 36 and compressed air is blown from the lower side of the film F, in such a manner that the above film, F, which has become free, does not contact the bottom of the conveying loop room 36, where film F is stored.

At the No. 4 station (IV), the spool chuck 30 engages with the take-up servomotor 38, which is installed on spool turret, thereby making the rotation for take-up of film F. The film F, whose rear end has become free as stated above, maintains a definite take-up angle and appropriate tension is given by the blowing of compressed air from the nozzle 37. Take servomotor 38 is connected to a take-up control device 39, which controls the take-up rotation. Further, take-up control device 39 is connected to the above control means 7. When the control signal of the control means 7 is input into the take-up control device 39, control signals for take-up rotation and stopping are sent to the take-up servomotor 38, according to the designated film length. Take-up of the film F is carried out, so as to keep the tip length at rear end of the film constant.

The spool 18, which has completed take-up of the film F at No. 4 station (IV), is rotated to the next No. 5 station (V), where inspection for availability of film take-up, confirmation, of film tip length, etc. are made, and then it is rotated to the No. 6 station (VI).

At the this No. 6 (VI) station, the transfer turret 40 is connectively installed to the spool turret 27, to which the spool 18, after film take-up, is held, and the transfer turret 40 is connectively installed to the patrone turret 41. The receiving holder 42 is placed at an equal interval on transfer turret 40, and the receiving holder 42 holds the spool 18, after the above film take-up, and transfers it to the next patrone turret 41.

To this patrone turret 41, the patrone 44, which has been arranged in the prescribed direction, is supplied continuously from the rail chute for patrone supply 43. To the rail chute for patrone supply 43, the patrone supply device 45 is connected, and further, this patrone supply device 45 is connected to the above control means 7, via the patrone control device 46. When the film size is designated by control means 7, control signal is input into the patrone control device 46, and signals are sent to the patrone supply device 45, so as to supply the patrone 44, conforming to the designated film size, being linked with movements of the film processing apparatus as a whole, thereby supplying the prescribed patrone 44 to the patrone turret 41 at the prescribed timing. Into the patrone 44, which has been supplied to patrone turret 41, the spool 18, which has taken up the film and has been held in the receiving holder 42 of the transfer turret 40, is inserted, and thereafter it is fitted with a cap and is taken out of the film processing apparatus.

Further, method and means of mounting the film onto the spool are not restricted to this embodiment, and, for example, tapes can be used. Furthermore, the dancer roller needs not be used. Additionally, in this embodiment explanations are made using an example where the film, to which the latent image is exposed, is cut to a prescribed length, after it is held on the spool. However, a method of holding the film on the spool after it is cut to a prescribed length, for example, may be used.

Further, with respect to this film processing apparatus, an embodiment where the patrone control device 46, which is controlled according to the size setting in the control means 7, is not provided, is acceptable. In this case, the scale feeding is to be stopped by the scale control device, and the product already cut is to be processed consecutively.

At the point in time after completion of the entire product processing, the film processor as a whole is stopped. Then, by the operation of the above means for size input K the film is switched to the new film size, and, further, the patrone from patrone supply device 45 is switched to the one for the new film size, and then operation of the film processor is restarted.

As stated above, in the above film processing apparatus even when there arises a switching of film size, it is possible to expose the prescribed latent image, conforming to the film size, onto the film, cut it to the prescribed film size, and, further, control it to adjust the take-up rotation according to the prescribed film length by switching of the size setting, thereby facilitating change of the film size and also permitting the switching in a short time. Further, it is possible to cut and take-up the film to the prescribed length according to each size, without providing a number of film conveying paths, thereby simplifying the mechanism and reducing the size of apparatus.

Further, in addition to the above stated effects, it is possible to control switching of the package material, where the package material charging means is changed to the prescribed package material by switching the size setting, thereby facilitating the film size switching work up to the last processing phase and also permitting the work to be carried out in a short time.

What is claimed is:

1. A film processing apparatus comprising:
   latent image exposing means for exposing a latent image onto an unexposed film being conveyed;
   mounting means for holding a latent-image exposed film on a spool;
   scale portion means for cutting the latent-image exposed film into a prescribed film length;
   take-up means for taking up the latent image exposed film which has been cut into the prescribed film length;
   size input means for selectively inputting the prescribed film length of the latent-image exposed film to be cut;
   control means for outputting a control signal based on a size setting inputted into the size input means;
   latent image control means for controlling the latent image exposing means and for exposing the prescribed latent image onto the unexposed film;
   scale portion control means for controlling the scale portion means in response to the control signal to cut the latent-image exposed film into the prescribed film length; and
   take-up control means for controlling the take-up means in response to the control signal to rotate the take-up means a predetermined number of rotations according to the prescribed film length.

2. The film processing apparatus of claim 1, wherein the latent-image exposed film is cut into the prescribed film length after being mounted on the spool.

3. The film processing apparatus of claim 1, wherein the latent-image exposed film is mounted on the spool after being cut into the prescribed film length.

4. The film processing apparatus of claim 1, further comprising package material charging means for collecting and conveying the latent-image exposed film mounted on the spool into a prescribed package material.

5. The film processing apparatus of claim 4, further comprising package material supply control means for controlling the package material charging means in response to the control signal from the control means to switch the size of the prescribed package material.

6. A photosensitive film processing device comprising:
   a latent image exposer for exposing a latent image onto an unexposed film;
   mounting means for mounting an exposed film on a spool;
   a scale portion for cutting the exposed film into a prescribed film length;
   scale portion control means for controlling the scale portion;
   take-up means for taking up the cut prescribed film length on the spool;
   take-up control means for controlling the timing and rotation of the take-up means;
   package material supply control means for selecting a patrone according to the prescribed film length; and
   control means for receiving an input signal of film size according to the prescribed film length and for outputting control signals to the latent image exposer, the mounting means, the scale portion control means and the take-up control means.

* * * * *